(12) United States Patent
Fei et al.

(10) Patent No.: US 12,159,427 B2
(45) Date of Patent: Dec. 3, 2024

(54) OBJECT POSITION DETERMINING SYSTEM AND OBJECT DETECTION SYSTEM

(71) Applicant: PixArt Imaging Inc., Hsin-Chu (TW)

(72) Inventors: Ming Shun Manson Fei, Hsin-Chu (TW); Sen-Huang Huang, Hsin-Chu (TW); Chi-Chieh Liao, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 411 days.

(21) Appl. No.: 17/579,529

(22) Filed: Jan. 19, 2022

(65) Prior Publication Data

US 2023/0045075 A1 Feb. 9, 2023

Related U.S. Application Data

(60) Provisional application No. 63/230,068, filed on Aug. 6, 2021.

(51) Int. Cl.
*G06T 7/70* (2017.01)
*G06T 7/521* (2017.01)
*G06V 10/20* (2022.01)

(52) U.S. Cl.
CPC ............... *G06T 7/70* (2017.01); *G06T 7/521* (2017.01); *G06V 10/255* (2022.01)

(58) Field of Classification Search
CPC ......... G06T 7/70; G06T 7/521; G06V 10/255; G06V 20/59
USPC .......................................................... 382/103
See application file for complete search history.

(56) References Cited

U.S. PATENT DOCUMENTS

| | | | |
|---|---|---|---|
| 11,355,014 B1 * | 6/2022 | Baik | ................. G06V 40/20 |
| 2019/0324147 A1 * | 10/2019 | Day | ................. G06F 18/24 |
| 2020/0097012 A1 * | 3/2020 | Hong | ................. A47L 9/2805 |
| 2020/0406814 A1 * | 12/2020 | Cunningham, III | ... G08G 1/167 |

* cited by examiner

*Primary Examiner* — Stephen P Coleman
(74) *Attorney, Agent, or Firm* — Winston Hsu

(57) ABSTRACT

An object position determining system comprising: at least one light source, configured to emit light; at least one optical sensor, configured to sense optical data generated based on reflected light of the light; and a processing circuit, configured to compute distance information between the optical sensor and an object which generates the reflected light. The processing circuit further determines a position of the object according to the distance information.

14 Claims, 5 Drawing Sheets

OBJECT POSITION DETERMINING SYSTEM AND OBJECT DETECTION SYSTEM

CROSS REFERENCE TO RELATED APPLICATIONS

This application claims the benefit of U.S. Provisional Application No. 63/230,068, filed on Aug. 06, 2021, the contents of which are incorporated herein by reference.

BACKGROUND OF THE INVENTION

1. Field of the Invention

The present invention relates to an object position determining system and an object detection system, and particularly relates to an object position determining system and object detection system which can detect existence or a position of an object according to distance information.

2. Description of the Prior Art

A conventional object detection system may detect existence of an object. However, scopes of applications thereof are always limited. For example, a proximity sensor can only determine whether the object is in a far state or a close state but not calculate real distances. Also, an FIR (Far Infrared) device can only detect human bodies, even only moving human bodies. Additionally, an object detection system which applies an AI (artificial intelligence) algorithm may need to train the AI algorithm for a long time.

Therefore, a new object detection method is needed.

SUMMARY OF THE INVENTION

Therefore, one objective of the present invention is to provide an object detection mechanism which has a wide range application.

One embodiment of the present invention discloses an object position determining system comprising: at least one light source, configured to emit light; at least one optical sensor, configured to sense optical data generated based on reflected light of the light; and a processing circuit, configured to compute distance information between the optical sensor and an object which generates the reflected light. The processing circuit further determines a position of the object according to the distance information.

Another embodiment of the present invention discloses an object detection device, comprising: at least one light source, configured to emit light; at least one optical sensor, configured to sense optical data generated based on reflected light of the light; and a processing circuit, configured to compute distance information between the optical sensor and an object which generates the reflected light. The processing circuit further determines if a target space is occupied according to the distance information.

In view of above-mentioned descriptions, an object detection mechanism which can be applied for object position detection, object existence detection and object location detection can be acquired.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices. Further, in following descriptions, the term "position" means a particular way in which someone or something is arranged.

Figure 1:
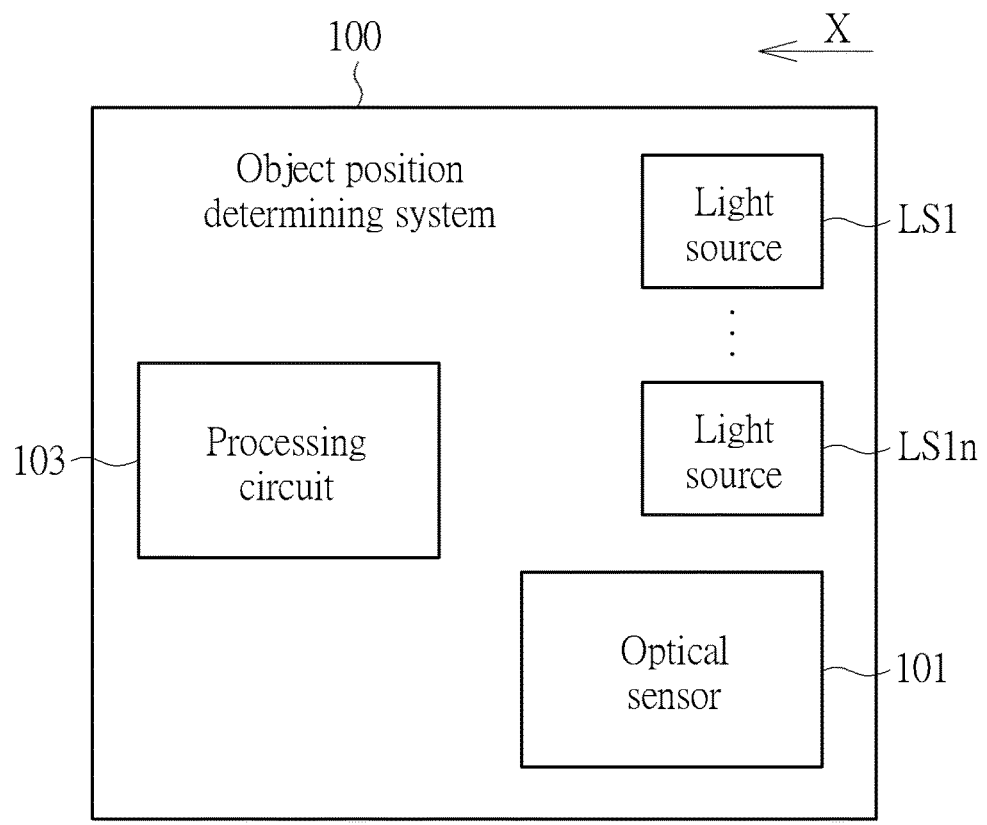
FIG. 1 is a block diagram illustrating an object position determining device according to one embodiment of the present invention.

FIG. 1 is a block diagram illustrating an object position determining device according to one embodiment of the present invention. As illustrated in FIG. 1, the object position determining device 100 comprises at least one light source LS1 . . . LS1n, an optical sensor 101 and a processing circuit 103. The light source LS11 . . . LS1n is configured to emit light. n is a positive integer. The optical sensor 101 is configured to sense optical data generated based on reflected light of the light. In one embodiment, the optical sensor 101 is an image sensor which is configured to sense sensing images which contain images of the reflected light. The processing circuit 103 is configured to compute distance information between the optical sensor 101 and at least one object which generates the reflected light. The processing circuit 103 further determines at least one position of the object(s) according to the distance information. The object, which can be any type of the object, will be described for more details later. In following embodiments, a number of the object is one, and a number of the position is one, but not limited.

In one embodiment, the distance information comprises at least one distance value. In other words, the processing circuit 103 determines the position of the object according to the real distance (the distance value) between the optical sensor 101 and the object. In one embodiment, the processing circuit 103 computes a plurality distance values in multi axes between the optical sensor 101 and the object (i.e., multi axes distances between the optical sensor 101 and the object) to determine the object position. Details of "multi axes" will be described later. Various methods can be applied to compute distance values. For example, the processing circuit 103 can compute the distance value according to a time of emitting the light, a time of receiving the reflected light, and the light speed. However, the distance value computations can be implemented by other methods, for example, based on light phase difference.

Furthermore, the light source LS1 . . . LS1*n* can be any type of light source. For example, the light source LS1 . . . LS1*n* can be line light source(s), plane light source(s), or point light source(s).

Figure 2:
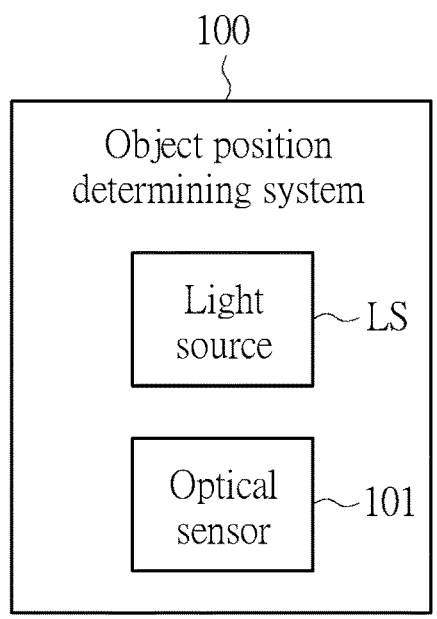
FIG. 2 is a schematic diagram illustrating the object position determining device illustrated in FIG. 1 in another view.

FIG. 2 is a schematic diagram illustrating the object position determining device illustrated in FIG. 1 in another view. Specifically, FIG. 2 is a schematic diagram illustrating the object position determining device in FIG. 1 viewed in the direction X. In the embodiment of FIG. 2, the number of the light sources LS1 . . . LS1*n* is one, which is labeled as LS. Also, the light source LS is a plane light source.

Figure 3:
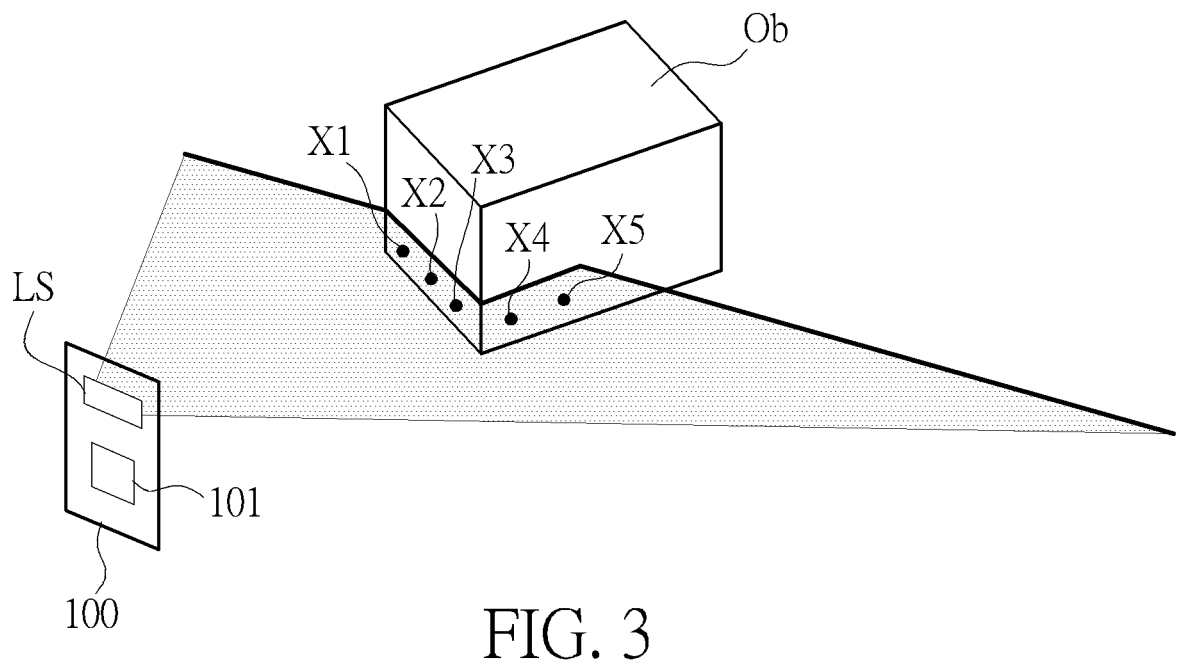
FIG. 3 is a schematic diagram illustrating how the object position determining device emits light on the object, according to one embodiment of the present invention.

FIG. 3 is a schematic diagram illustrating how the object position determining device emits light on the object, according to one embodiment of the present invention. Please note, the structure of the object position determining device 100 in FIG. 3 is the same as which of the object position determining device 100 in FIG. 2, but not limited. As illustrated in FIG. 3, the light from the light source 101 is emitted to the object Ob. AS above-mentioned, the processing circuit 103 computes a plurality distance values in multi axis between the optical sensor 101 and the object Ob, to determine the position of the object Ob. The distance values in multi axis mean distances values between different points (or portions) of the object Ob and the optical sensor 101. For example, the processing circuit 103 computes distance values between points X1, X2, X3, X4, X5 of the object Ob and the optical sensor 101. Please note, the processing circuit 103 is not limited to compute distance values in multi axes only when the light source LS is a plane light source. The processing circuit 103 can also compute distance values in multi axes when the light source LS comprises at least one line light source or the light sources comprise a plurality of point light sources.

In one embodiment, the "multi axes" means at least two different kinds of light sources are used, for example, a vertical line light source and a horizontal line light source. In such case, the above-mentioned distance information comprises "relative distance variation" between the object and the object position determining device. In one embodiment, such "relative distance variation" can be caused by the displacement of the object Ob, or whether the object Ob exists or not. The displacement of the object Ob, and the existence of the object Ob can be detected when the variation of at least one of a centroid of optical data generated according to light from the vertical line light source and a centroid of optical data generated according to light from the horizontal line light source is detected. Please note, in such example, the displacement or the existence of the object Ob can be detected but the distance values are not acquired. In one embodiment, the distance values can be acquired if other reference values can be acquired when at least two different kinds of light sources are used. For example, if a predetermined distance value between the object and the center of the vertical line light source, the horizontal line light source is set, the real distance values can be anticipated based on the above-mentioned centroid variation.

In one embodiment, the above-mentioned position is an inclining state of the object. In such case, the object can be a human body, a chair or a tray table. FIG. 4-FIG. 8 are schematic diagrams illustrating applications of the above-mentioned object position determining device, according to embodiments of the present invention.

Figure 4:
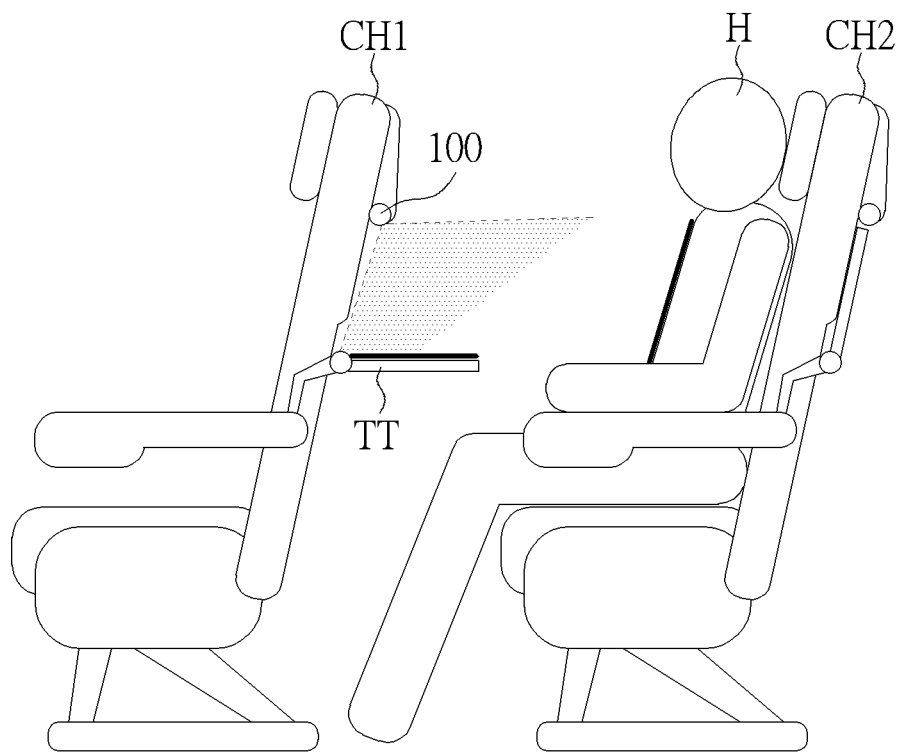
FIG. 4-FIG. 9 are schematic diagrams illustrating applications of the object position determining device, according to embodiments of the present invention.

As illustrated in FIG. 4, the light source LS in the object position determining device 100 emits light to a tray table TT which is installed on a chair Ch1. Also, the processing circuit 103 in the object position determining device 100 computes distance information between the tray table TT and the optical sensor 101 according to the optical data generated according to reflected light from the tray table TT. Then, the processing circuit 103 determines a position of the tray table TT according to the distance information. For example, in FIG. 4, the processing circuit 103 determines the tray table TT is in an up position according to the distance information. Also, in FIG. 5, the processing circuit 103 determines the tray table TT is in a down position according to the distance information. In other words, the processing circuit 103 determines an inclining state of the tray table TT according to the distance information. The inclining state of the tray table TT comprises but not limited to the up and down state illustrated in FIG. 4 and FIG. 5.

As above-mentioned, the distance information can comprise at least one distance value, thus the processing circuit 103 can determine the position of the tray table TT according to the distance value(s). For example, if at least partial of the distance value(s) is larger than a threshold, the processing circuit 103 determines the tray table TT is in an up position. On the contrary, if at least partial of the distance value(s) is smaller than the threshold, the processing circuit 103 determines the tray table TT is in a down position.

Figure 5:
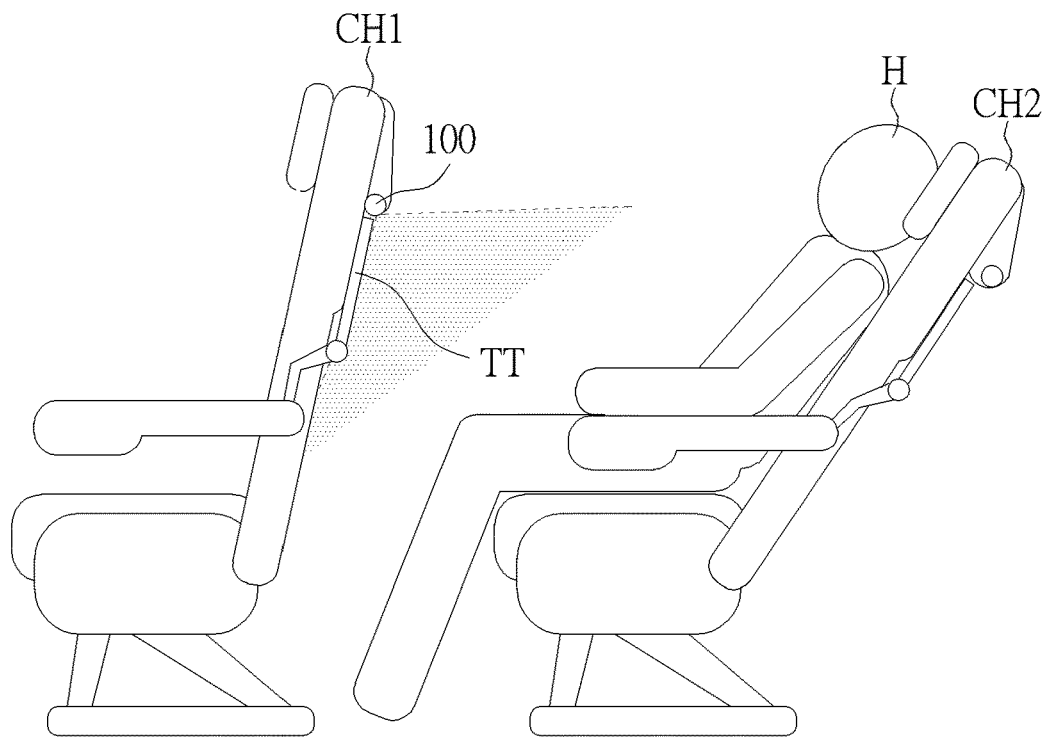

Besides the tray table TT, the processing circuit 103 can further compute distance information between a human body H and the optical sensor 101 in the object position determining device 100. In the embodiments of FIG. 4 and FIG. 5, the human body H is a human body of the user who uses the tray table TT, but not limited. After that, the processing circuit 103 determines an inclining state of the human body H according to the distance information. For example, in the embodiment of FIG. 4, the processing circuit 103 determines the human body H is in an upright position according to the distance information. For another example, in the embodiment of FIG. 5, the processing circuit 103 determines the human body H is in a reclining position according to the distance information.

As above-mentioned, the distance information can comprise at least one distance value, thus the processing circuit 103 can determine the position of the human body H according to the distance value(s). For example, if at least partial of the distance value(s) is smaller than a threshold, the processing circuit 103 determines the human body H is in the upright position. On the contrary, if at least partial of the distance value(s) is larger than the threshold, the processing circuit 103 determines the human body H is in a reclining position. In another example, if at least one variation of the distance value is smaller than a difference threshold, the processing circuit 103 determines the human body H is in the upright position, since the human body H causes less distance difference while in the upright position. Oppositely, if at least one variation of the distance value is larger than a difference threshold, the processing circuit 103 determines the human body H is in the reclining position, since the human body H causes more distance difference while in the reclining position.

The rules illustrated in FIG. 4 and FIG. 5 can also be applied for determining an inclining state of a chair. In the embodiments of FIG. 4, FIG. 5, the inclining state of the chair CH2 corresponding to the inclining state of the human body H sitting on the chair CH2. Therefore, if the processing circuit 103 determines the human body H is in the reclining position, the processing circuit 103 can also determine that the chair CH2 is in the reclining position. Similarly, if the processing circuit 103 determines the human body H is in the upright position, the processing circuit 103 can also determine that the chair CH2 is in the upright position.

Figure 6:
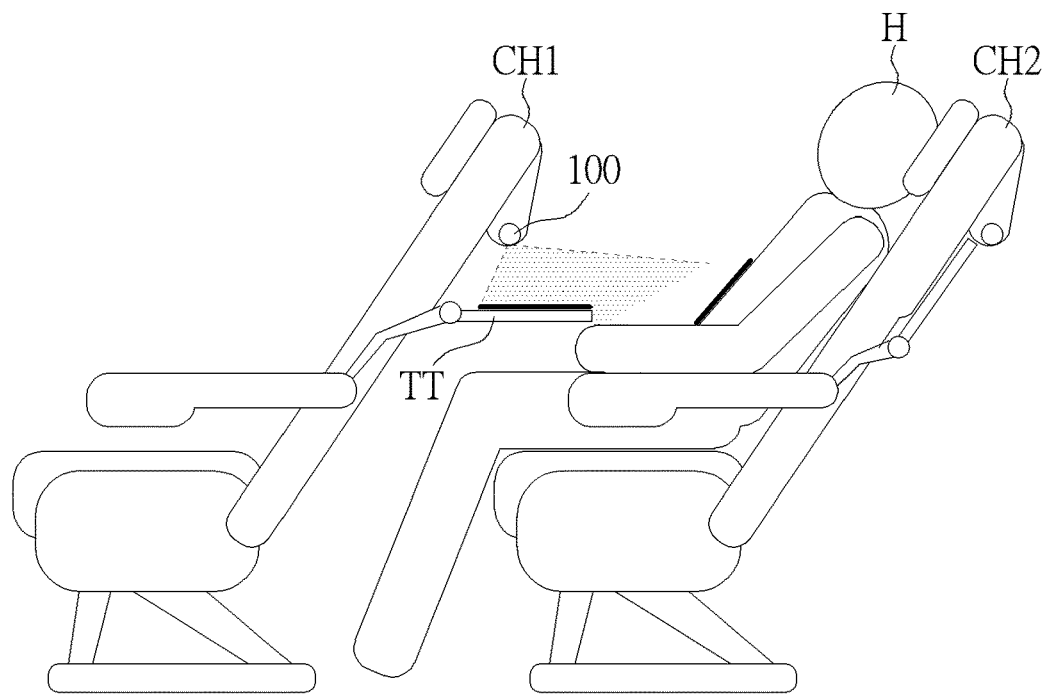

In the embodiment of FIG. 5, the inclining state of the human body H is determined when the tray table TT is in an up position. However, the inclining state of the human body H can be determined when the tray table TT is in a down position, as illustrated in the embodiment of FIG. 6. Many methods can be applied to implement the embodiment in FIG. 6. For example, the processing circuit 103 in the object position determining device 100 determines the inclining state of the human body H according to optical data sensed by a region of the optical sensor 101 which corresponds to an upper part of the human body H, such as an upper region of the optical sensor 101. Similarly, the processing circuit 103 determines the inclining state of the human body H, according to optical data sensed by a region of the optical sensor 101 which corresponds to the tray table TT, such as a lower region of the optical sensor 101.

Figure 7:
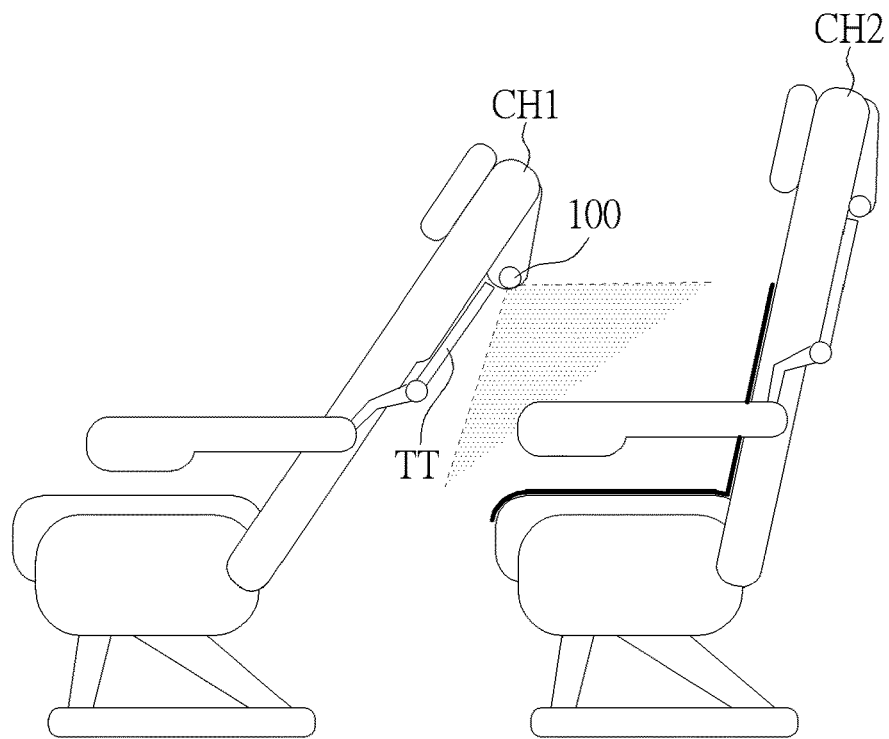

Besides the applications illustrated in FIG. 4-FIG. 6, the object position determining device 100 can be further used to determine whether a chair is occupied or not. As shown in FIG. 7, the processing circuit 103 in the object position determining device 100 determines whether the chair CH2 is occupied or not according to the distance information.

As above-mentioned, the distance information can comprise a plurality of distance values, thus the processing circuit 103 can determine whether the chair CH2 is occupied or not according to the distance values. For example, if variations of the distance values are smooth, it means the chair CH2 is not occupied since the chair back of the chair CH2 has a flat surface which causes less distance difference. On the contrary, if variations of the distance values are strong, it means the chair CH2 is occupied by a user since a human body always has an irregular surface thus causes more distance difference. The method illustrated in FIG. 7 can also be regarded as "determining whether a human body exists or not according to the distance information".

Figure 8:
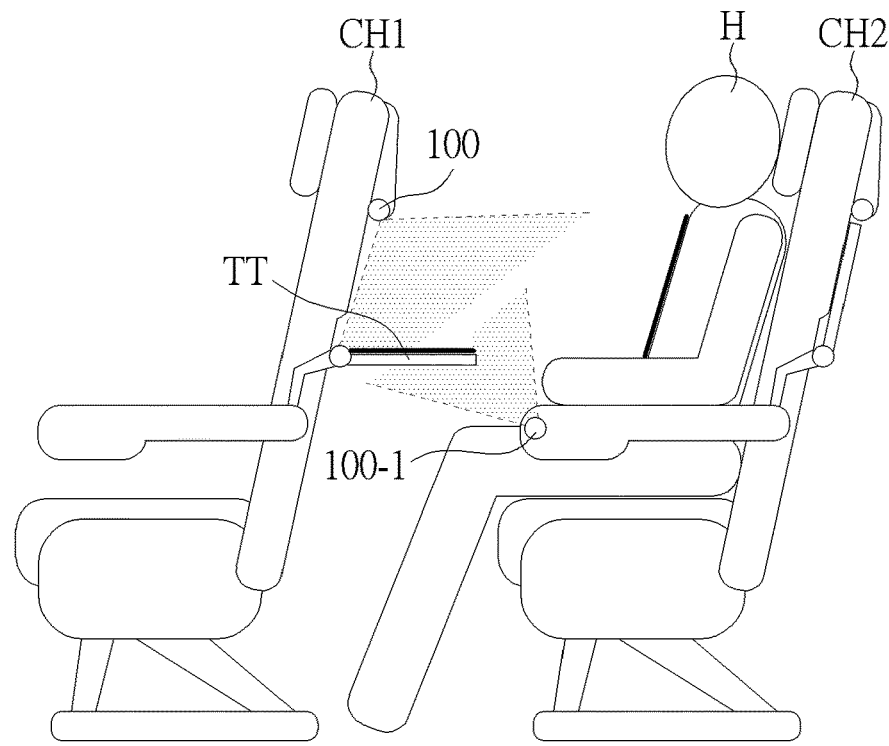

In the above-mentioned embodiments in FIG. 4-FIG. 7, the object position determining system provided by the present invention comprises only one object position determining device 100. However, the object position determining system provided by the present invention may comprise more than one object position determining device. As illustrated in the embodiment of FIG. 8, the object position determining system further comprises another object position determining device 100_1. The object position determining device 100 is applied for determining a position of the human body H and/or a position of the chair CH2. As above-mentioned, the first object position determining device 100 can further be applied to determine whether the chair CH2 is occupied or not. Besides, the object position determining device 100_1 is applied for determining a position of the tray table TT. By this way, the position determining of the tray table TT, the human body H, and the chair CH2, can be more accurate.

The object position determining system illustrated in FIG. 8 can be summarized as follows:

An object position determining system comprises a first object position determining device (e.g., 100) and a second object position determining device (e.g., 100_1). The first object position determining device comprises at least one first light source, a first optical sensor, and a first processing circuit. The first light source is configured to emit the first light. The first optical sensor is configured to sense the first optical data generated based on the reflected light of the first light. The first processing circuit is configured to compute a set of the first distance information between the first optical sensor and a human body H or a chair CH2 which generates the first reflected light. The first processing circuit determines an inclining state of the human body H or the chair CH2, according to the first distance information.

The second light source is configured to emit second light. The second optical sensor is configured to sense the second optical data generated based on the reflected light of the second light. The second processing circuit computes a set of the second distance information between the second optical sensor and the tray table TT, which generates the second reflected light. The second processing circuit further determines the inclining state of the tray table according to the second distance information.

In one embodiment, the first object position determining device is located above the tray table TT. The second object position determining device is located below the tray table TT and on the chair CH2.

In one embodiment, the object position determining system further comprises a prompt message generation device, which is configured to generate a prompt message according to the inclining state. For example, if the embodiments illustrated in FIG. 4-FIG. 8 are applied in an airplane, the prompt message generation device can generate prompt messages to inform that the tray table and/or the chairs are in wrong positions. For instance, the chair is still in the reclining position when the air plane takes off. Also, the prompt message generation device can generate prompt messages to inform a number of the available seats, for the reference of flight attendants.

Figure 9:
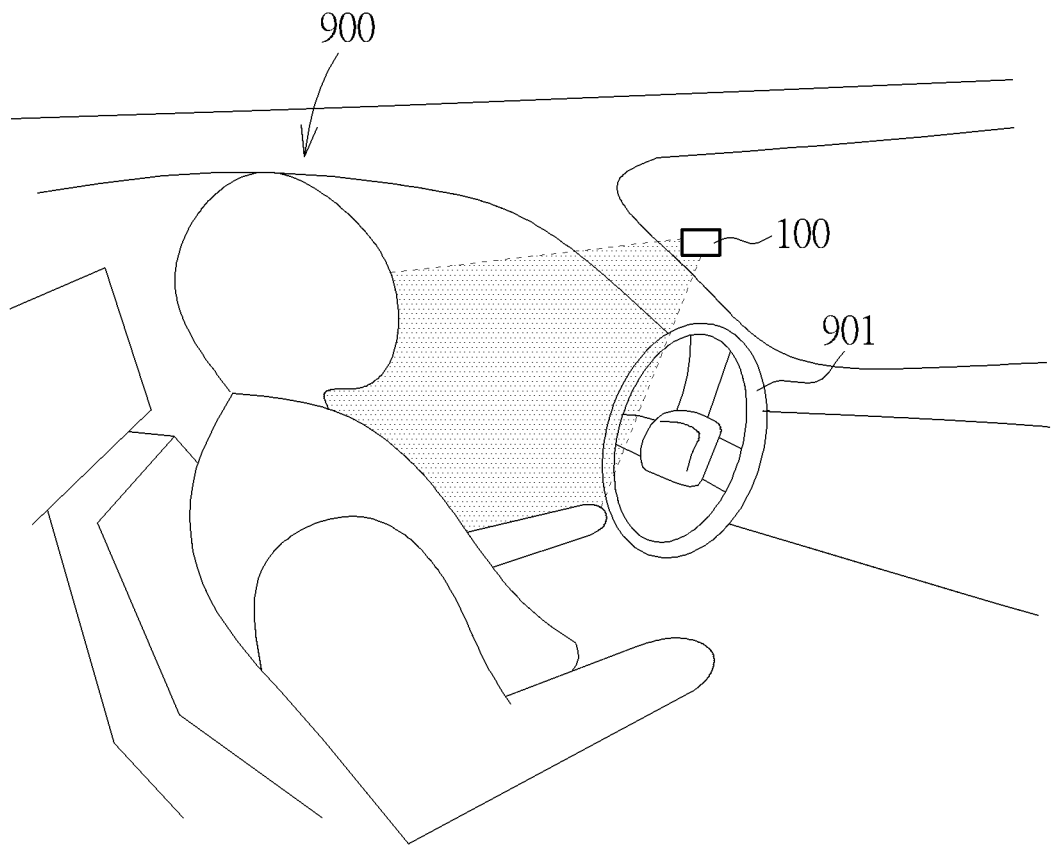

The concepts disclosed in the embodiments of FIG. 4-FIG. 8 can be further used for other applications. In one embodiment, the method of determining the inclining state of human body can be used for determining a state of a vehicle driver. As shown in FIG. 9, if the vehicle driver 900 is determined to be in an upright position, it means that the vehicle driver is normally driving. Oppositely, if the vehicle driver 900 is determined to be in a reclining position, it may means that the vehicle driver may fall in asleep. Under such case, the prompt message generation device can generate sounds to wake up the vehicle driver. In the embodiment of FIG. 9, the object position determining device 100 can be provided above the steering wheel 900, but not limited.

Also, in another embodiment, the steps of determining the inclining state of the human body can be applied for determining a posture of a human body. Such application can be used for sport training such as dancing training or gymnastics training. Besides, such application can be used for deportment training.

Additionally, the method of determining whether the chair is occupied can be used for determining whether a container is occupied. Such application can be used for a packaging factory, for example, determining if the goods is put inside the box. Please note, the container can be replaced by any other target space. The target space can be, for example, a compartment, an elevator or a parking space. In one embodiment, the target space is under the brake pedal, thus the method provided by the present invention can be applied to determine if the space below the brake pedal is occupied, which means the method provided by the present invention can be applied to determine whether the brake pedal is blocked. Following the same way, the method provided by the present invention can be applied to determine if any operation is blocked by an object.

Furthermore, the processing circuit 103 can determine a location of the object exists according to the distance information. For example, in one embodiment, the processing circuit 103 can determine a "real distance" between the object and the object position determining device according to the acquired distance values. After that, the processing circuit 103 can determine a location of the object according to the real distance.

Please note, an electronic device having structures the same as which of the object position determining device 100 can only be used for determining whether a container is occupied or a chair is occupied but not for determining the object position. In such case, the electronic device can be regarded as an object detection device. The object detection device can further be applied to determine a location of the object according to the distance information.

Scope of the present invention is not limited to the above-mentioned embodiments. Other applications based on the concept disclosed above, should also fall in the scope of the present invention.

In view of above-mentioned descriptions, an object detection mechanism which can be applied for object position detection, object existence detection and object location detection can be acquired.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object position determining system, comprising:
   at least one light source, configured to emit light;
   at least one optical sensor, configured to sense optical data generated based on reflected light of the light; and
   a processing circuit, configured to compute distance information between the optical sensor and at least one object which generates the reflected light;
   wherein the processing circuit further determines at least one position of the object according to the distance information;
   wherein the object position determining system comprises:
   a first object position determining device, comprising:
      at least one first light source, configured to emit first light;
      a first optical sensor, configured to sense first optical data generated based on reflected light of the first light;
      a first processing circuit, configured to compute at least one set of first distance information between the first optical sensor and a human body or a chair, which generates the first reflected light;
   a second object position determining device, comprising:
      at least one second light source, configured to emit second light;
      a second optical sensor, configured to sense second optical data generated based on reflected light of the second light; and
      a second processing circuit, configured to compute at least one set of second distance information between the second optical sensor and the tray table, which generates the second reflected light;
   wherein the first object position determining device is located above the tray table, and the second object position determining device located below the tray table;
   wherein the first processing circuit determines an inclining state of the human body or the chair according to the first distance information;
   wherein the second processing circuit further determines the inclining state of the tray table according to the second distance information;
   wherein the light source is the first light source or the second, the optical sensor is the first optical sensor or the second optical sensor, and the processing circuit is the first processing circuit or the second processing circuit.

2. The object position determining system of claim 1, wherein the distance information comprises at least one distance value, and the processing circuit determines the position according to the distance value.

3. The object position determining system of claim 2, wherein the processing circuit determines the position by computing multi axes distances between the optical sensor and the object.

4. The object position determining system of claim 1, wherein the distance information comprises a relative distance variation, and the processing circuit determines the position according to the relative distance variation.

5. The object position determining system of claim 1, wherein the light source is at least one line light source, a plane light source, or a plurality of point light sources.

6. The object position determining system of claim 1, wherein the position is an inclining state of the object.

7. The object position determining system of claim 6, wherein the object is a chair.

8. The object position determining system of claim 6, wherein the object is a human body.

9. The object position determining system of claim 6, wherein the object is a tray table.

10. The object position determining system of claim 6, further comprising:
    a prompt message generation device, configured to generate
    a prompt message according to the inclining state.

11. The object position determining system of claim 1, wherein the second object position determining device is located on the chair.

12. The object position determining system of claim 1, wherein the processing circuit further determines if a target space is occupied according to the distance information.

13. The object position determining system of claim 12, wherein the target space is a chair, a compartment, a container, an elevator or a parking space.

14. The object position determining system of claim 1, wherein the processing circuit further determines a location of the object according to the distance information.

* * * * *